(12) United States Patent
Peng (10) Patent No.: US 7,320,010 B2
(45) Date of Patent: Jan. 15, 2008

(54) CONTROLLING UPDATES OF ELECTRONIC FILES

(75) Inventor: Luosheng Peng, Alviso, CA (US)

(73) Assignee: InnoPath Software, Inc., Sunnyvale, CA (US)

( * ) Notice: Subject to any disclaimer, the term of this patent is extended or adjusted under 35 U.S.C. 154(b) by 437 days.

(21) Appl. No.: 10/298,863

(22) Filed: Nov. 18, 2002

(65) Prior Publication Data

US 2004/0098413 A1 May 20, 2004

(51) Int. Cl.
*G06F 12/00* (2006.01)
*G06F 15/16* (2006.01)

(52) U.S. Cl. .......................... 707/200; 707/100; 707/8; 709/217; 709/218; 709/219

(58) Field of Classification Search ................ 707/10, 707/203, 3, 204, 100–101, 201–202, 205; 709/202–203, 217–219; 365/230.03
See application file for complete search history.

(56) References Cited

U.S. PATENT DOCUMENTS

| | | | |
|---|---|---|---|
| 4,875,159 A | 10/1989 | Cary | |
| 5,444,764 A | 8/1995 | Galecki | |
| 5,479,654 A | 12/1995 | Squibb | |
| 5,574,906 A | 11/1996 | Morris | |
| 5,634,052 A | 5/1997 | Morris | |
| 5,729,735 A | 3/1998 | Meyering | |
| 5,742,905 A * | 4/1998 | Pepe et al. ................ | 455/461 |
| 5,758,062 A | 5/1998 | McMahon | |
| 5,806,078 A * | 9/1998 | Hug et al. ................ | 715/511 |
| 5,813,017 A | 9/1998 | Morris | |
| 5,832,520 A * | 11/1998 | Miller ........................ | 707/203 |
| 5,850,565 A | 12/1998 | Wightman | |
| 5,864,757 A | 1/1999 | Parker | |
| 5,893,119 A | 4/1999 | Squibb | |
| 6,018,747 A | 1/2000 | Burns | |
| 6,041,333 A | 3/2000 | Bretschneider | |
| 6,052,531 A * | 4/2000 | Waldin et al. ............. | 707/203 |

(Continued)

OTHER PUBLICATIONS

Tichy, Walter F., "The string-to-string correction problem with block moves", ACM Transaction on Computer Systems, vol. 2, No. 4, Nov. 1984, pp. 309-321.

(Continued)

*Primary Examiner*—Shahid Alam
*Assistant Examiner*—Anh Ly
(74) *Attorney, Agent, or Firm*—Courtney Staniford & Gregory LLP (57) ABSTRACT

In controlling electronic file updates, an upgrade system identifies host device models that include an original electronic file upon receipt of a new file, when the new file is an updated version of the original file. Using the identified model list, the upgrade system automatically generates a target list of subscribers that use the identified models. The upgrade system filters the target list using data of pre-defined user groups and generates subgroups of the target list. The pre-defined groups can include groupings made according to any criteria. The upgrade system selects an upgrade control policy for each user according to the subgroup to which the user is a member. The upgrade control policy controls device update parameters. The upgrade system transmits upgrades and/or upgrade notifications to the appropriate host devices in accordance with the selected upgrade control policies.

26 Claims, 4 Drawing Sheets

U.S. PATENT DOCUMENTS

| | | | |
|---|---|---|---|
| 6,076,148 A | 6/2000 | Kedem | |
| 6,078,967 A | 6/2000 | Fulghum | |
| 6,088,694 A | 7/2000 | Burns | |
| 6,128,629 A | 10/2000 | Bretschneider et al. | |
| 6,145,012 A | 11/2000 | Small | |
| 6,163,811 A | 12/2000 | Porter | |
| 6,167,258 A | 12/2000 | Schmidt | |
| 6,216,175 B1* | 4/2001 | Sliger et al. | 717/169 |
| 6,226,784 B1* | 5/2001 | Holmes et al. | 717/100 |
| 6,233,589 B1 | 5/2001 | Balcha | |
| 6,269,456 B1* | 7/2001 | Hodges et al. | 713/201 |
| 6,272,536 B1* | 8/2001 | van Hoff et al. | 707/201 |
| 6,324,544 B1* | 11/2001 | Alam et al. | 707/201 |
| 6,327,671 B1 | 12/2001 | Menon | |
| 6,349,311 B1* | 2/2002 | Sobel et al. | 707/203 |
| 6,374,250 B2* | 4/2002 | Ajtai et al. | 707/101 |
| 6,401,239 B1 | 6/2002 | Miron | |
| 6,411,227 B1 | 6/2002 | Fish | |
| 6,442,660 B1 | 8/2002 | Henerlau | |
| 6,457,175 B1 | 9/2002 | Lerche | |
| 6,466,999 B1 | 10/2002 | Sliger | |
| 6,470,329 B1* | 10/2002 | Livschitz | 707/203 |
| 6,526,574 B1* | 2/2003 | Jones | 707/101 |
| 6,535,894 B1* | 3/2003 | Schmidt et al. | 707/204 |
| 6,542,906 B2 | 4/2003 | Korn | |
| 6,594,822 B1 | 7/2003 | Schweitz | |
| 6,615,404 B1 | 9/2003 | Garfunkel | |
| 6,629,110 B2 | 9/2003 | Cane | |
| 6,651,061 B2 | 11/2003 | Unchida | |
| 6,651,190 B1 | 11/2003 | Worley | |
| 6,662,163 B1 | 12/2003 | Albayrak | |
| 6,671,703 B2 | 12/2003 | Thompson | |
| 6,671,757 B1 | 12/2003 | Multer | |
| 6,694,336 B1* | 2/2004 | Multer et al. | 707/10 |
| 6,701,315 B1* | 3/2004 | Austin | 707/10 |
| 6,754,816 B1 | 6/2004 | Layton | |
| 6,785,786 B1* | 8/2004 | Gold et al. | 711/162 |
| 6,836,657 B2* | 12/2004 | Ji et al. | 707/200 |
| 6,892,381 B2 | 5/2005 | Kim | |
| 6,898,564 B1 | 5/2005 | Odhner | |
| 6,912,591 B2 | 6/2005 | Lash | |
| 6,925,467 B2* | 8/2005 | Gu et al. | 707/101 |
| 6,954,765 B2* | 10/2005 | Spiegel | 707/200 |
| 7,020,750 B2* | 3/2006 | Thiyagaranjan et al. | 709/217 |
| 2001/0029178 A1* | 10/2001 | Criss et al. | 455/419 |
| 2001/0049263 A1 | 12/2001 | Zhang | |
| 2002/0099726 A1 | 7/2002 | Crudele | |
| 2002/0120697 A1* | 8/2002 | Generous et al. | 709/206 |
| 2002/0129107 A1* | 9/2002 | Loughran et al. | 709/206 |
| 2003/0110253 A1 | 6/2003 | Anuszczyk | |
| 2003/0121712 A1 | 7/2003 | Gu | |
| 2003/0200207 A1* | 10/2003 | Dickinson | 707/3 |
| 2003/0212712 A1* | 11/2003 | Gu et al. | 707/200 |
| 2003/0220944 A1 | 11/2003 | Schottland | |
| 2004/0031027 A1 | 2/2004 | Hiltgen | |
| 2004/0054854 A1* | 3/2004 | Thiyagaranjan et al. | 711/141 |
| 2004/0062130 A1* | 4/2004 | Ching | 365/230.03 |
| 2004/0073582 A1 | 4/2004 | Spiegel | |
| 2004/0092255 A1 | 5/2004 | Ji | |
| 2004/0098361 A1 | 5/2004 | Peng | |
| 2004/0098413 A1 | 5/2004 | Peng | |
| 2004/0098420 A1 | 5/2004 | Peng | |
| 2004/0098421 A1 | 5/2004 | Peng | |
| 2004/0098427 A1 | 5/2004 | Peng | |
| 2004/0111427 A1 | 6/2004 | Gu | |
| 2004/0111484 A1* | 6/2004 | Young et al. | 709/207 |
| 2004/0193643 A1 | 9/2004 | O'Brien | |
| 2004/0220980 A1* | 11/2004 | Forster | 707/204 |
| 2004/0225996 A1 | 11/2004 | Venkatesan | |
| 2004/0260923 A1 | 12/2004 | Nakai | |
| 2005/0010576 A1 | 1/2005 | Ren | |
| 2005/0010870 A1 | 1/2005 | Gu | |
| 2005/0060163 A1 | 3/2005 | Barsness | |
| 2005/0091288 A1* | 4/2005 | Ji et al. | 707/200 |
| 2005/0102318 A1 | 5/2005 | Odhner | |
| 2005/0234997 A1* | 10/2005 | Gu et al. | 707/104.1 |
| 2006/0098577 A1* | 5/2006 | MeLampy et al. | 370/238 |
| 2006/0206537 A1* | 9/2006 | Chiang | 707/200 |

OTHER PUBLICATIONS

Ajtai, Miklos et al., "Compactly encoding unstructured inputs with differential compression", IBM Almaden Research Center, 44 pages.

Burns, Randal C. et al., "In-place reconstruction of delta compressed files", IBM Almaden Research Center, 9 pages.

Burns, Randal et al., "In-place reconstruction of version differences", IBM Almaden Research Center, 25 pages.

Liv, Jacob et al., "A universal algorithm for sequential data compression", IEEE Transactions on Information Theory, vol. IT-23, No. 3, May 1977.

Hauptmann, Steffen et al., "On-line maintenance with on-the-fly software replacement", Configurable Distributed Systems, Proceedings, Third IEEE International Conference, May 6, 1996, pp. 80-80.

Chakravorty et al., "Architecture and implementation of a remote management framework for dynamically reconfigurable devices", Networks, 2002. ICON 2002. 10th IEEE International Conference, Aug. 27, 2002, pp. 375-380.

Lyu et al., "A procedure0based dynamic software update", Dependable Systems and Networks, 2001. Proceedings, The International Conference, Jul. 1, 2001. pp. 271-280.

Bialek, R. P., "The architecture of a dynamically updatable, component-based system", Computer Software and Application Conference, 2002. COMPSAC 2002. Proceedings, 26th Annual International, Aug. 26, 2002, pp. 1012-1016.

Gumbold, M., "Software distribution by reliable multicast", Local Computer Networks, 1996. Proceedings, 21st IEEE Conference, Oct. 13, 1996, pp. 222-231.

Ajtai, Miklos et al., "Compactly encoding unstructured inputs with differential compression", IBM Almaden Research Center, 44 pages, 2002.

Burns, Randal C. et al., "In-place reconstruction of delta compressed files", IBM Almaden Research Center, 9 pages, 267-275 1998.

Burns, Randal et al., "In-place reconstruction of version differences", IBM Almaden Research Center, 25 pages, Jul.-Aug. 2003.

* cited by examiner

CONTROLLING UPDATES OF ELECTRONIC FILES

RELATED APPLICATIONS

This application is related to the application titled BYTE-LEVEL FILE DIFFERENCING AND UPDATING ALGORITHMS, application Ser. No. 10/146,545 (now U.S. Pat. No. 6,925,467), filed May 13, 2002, the application titled UPDATING ELECTRONIC FILES USING BYTE-LEVEL FILE DIFFERENCING AND UPDATING ALGORITHMS, application Ser. No. 10/261,153, filed Sep. 30, 2002, the application titled UPGRADING OF ELECTRONIC FILES INCLUDING AUTOMATIC RECOVERY FROM FAILURES AND ERRORS OCCURRING DURING THE UPGRADE, application Ser. No. 10/292,245 (now U.S. Pat. No. 6,836,657), filed Nov. 12, 2002, the application titled DEVICE MEMORY MANAGEMENT DURING ELECTRONIC FILE UPDATING, application Ser. No. 10/298,458, filed Nov. 18, 2002, the application titled GENERATING DIFFERENCE FILES USING MODULE INFORMATION OF EMBEDDED SOFTWARE COMPONENTS, application Ser. No. 10/298,393, filed Nov. 18, 2002, the application titled SCHEDULING UPDATES OF ELECTRONIC FILES, application Ser. No. 10/298,862, filed Nov. 18, 2002, and the application titled MANAGING ELECTRONIC FILE UPDATES ON CLIENT DEVICES, application Ser. No. 10/298,896, filed Nov. 18, 2002, all of which are currently pending.

TECHNICAL FIELD

The disclosed embodiments relate to updating and maintaining electronic files.

BACKGROUND

Software running on a processor or central processing unit (CPU) to provide functionality in the host device often changes over time. The changes may result from the need to correct bugs, or errors, in the software files, adapt to evolving technologies, or add new features. In particular, embedded software components hosted on mobile wireless devices often include numerous software bugs that require correction.

Software includes one or more files in the form of human-readable American Standard Code for Information Interchange (ASCII) plain text files or binary code. Software files can be divided into smaller units that are often referred to as modules or components. A UNIX platform or personal computer (PC) includes multiple software components, and each of the software components is managed and updated independently through a file system supported by a corresponding operating system (OS). Information used to update software files or software components hosted on UNIX platforms or PCs can be transferred through the Internet or loaded from a secondary storage medium such as a floppy disk, a compact disk read-only memory (CD-ROM), or a compact flash card.

In contrast, in mobile wireless devices, a real-time operating system (RTOS) is typically used in which all software components are linked as a single large file. Further, no file system support is typically provided in these mobile wireless devices. In addition, the single large file needs to be preloaded, or embedded, into the device using a slow communication link like a radio, infrared, or serial link.

Obstacles to updating the large files of mobile wireless devices via slow communication links include the time, bandwidth, and cost associated with delivering the updated file to the device. Distribution of such large files can take an undesirably long time from the point of view of the customer and can consume a large amount of server resources from the point of view of the file provider. Delivering a large file over an unreliable communication link such as a radio link may also increase the rate of communication failure and require a large working memory within the device, for example random access memory (RAM).

One solution to the problem of delivering large files to mobile devices for use in updating files of the mobile devices uses difference programs to generate difference files. The difference files include data that describes how a revised file differs from an original file. While use of the various difference programs helps reduce the size of the transferred files, network traffic management issues remain because the service provider or software provider has many subscribers or customers to which they must potentially provide updated files including difference files.

Generally, the number of subscribers supported by a service provider along with bandwidth limitations of the associated network prohibits timely updates of all files on all subscriber devices each time a new update becomes available. However, the service provider does have to ensure that particular updates (e.g., bug fixes) to particular files are distributed in a timely fashion. Therefore, even when using difference files to reduce the network bandwidth requirements per file transfer, the service provider is faced with managing the delivery of software upgrades to large numbers of supported users.

In the drawings, the same reference numbers identify identical or substantially similar elements or acts. To easily identify the discussion of any particular element or act, the most significant digit or digits in a reference number refer to the Figure number in which that element is first introduced (e.g., element 116 is first introduced and discussed with respect to FIG. 1).

Unless described otherwise below, the construction and operation of the various blocks and structures shown in the Figures are of conventional design. As a result, such blocks need not be described in further detail herein, because they will be understood by those skilled in the relevant art. Such further detail is omitted for brevity and so as not to obscure the detailed description of the invention. Any modifications necessary to the Figures can be readily made by one skilled in the relevant art based on the detailed description provided herein.

DETAILED DESCRIPTION

A system and associated methods are provided below for controlling the delivery of electronic file upgrades to host devices like, for example, mobile devices. The upgrade system allows intelligent notifications of remote software changes to be sent to the mobile devices by using a filtering algorithm based on such parameters as device type, software/device dependency, and user preferences.

A software component distributor or service provider using these methods, upon receipt of a new electronic file that is an updated version of an original electronic file, identifies host device models that include the original electronic file. Using this list of identified models, the service provider automatically generates a target list of subscribers to their service that use the identified models. The service provider further filters the target list using data of pre-defined user groups to generate subgroups of the target list, where each user on the target list is found in at least one subgroup. The pre-defined groups can include, for example, groupings according to area code, city, county, state, and employer or corporate sponsor, but groupings can be made according to any criteria. The service provider then selects an upgrade control policy for each user according to the subgroup of which the user is a member. The upgrade control policy of an embodiment controls device update parameters including, for example, update type, which device files are available for updating, and update timing information, but is not so limited.

In the following description, numerous specific details are introduced to provide a thorough understanding of, and enabling description for, embodiments of the invention. One skilled in the relevant art, however, will recognize that the invention can be practiced without one or more of the specific details, or with other components, systems, etc. In other instances, well-known structures or operations are not shown, or are not described in detail, to avoid obscuring aspects of the invention.

Figure 1:
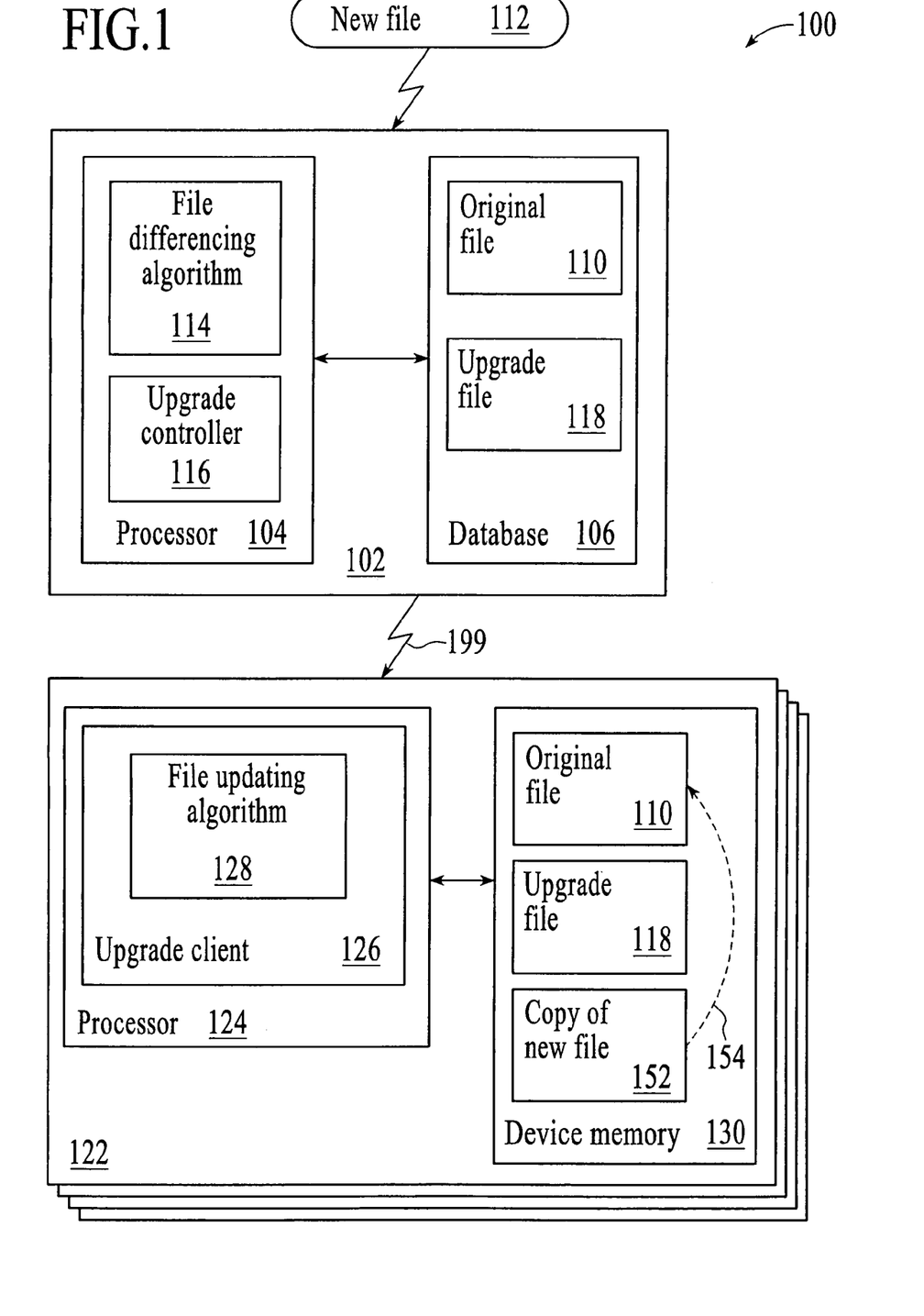
FIG. 1 is a block diagram of a file upgrade system including an upgrade controller for controlling file upgrades, under an embodiment.

FIG. 1 is a block diagram of a file upgrade system 100 including an upgrade controller 116 for controlling file upgrades, under an embodiment. Generally, the file upgrade system 100 includes a first computer system 102 and one or more second computer systems 122 communicating via a communication path 199. These computer systems 102 and 122 include any collection of computing devices operating together, as is known in the art. The computer systems 102 and 122 also include components within a larger computer system. The communication path 199 includes any medium for communicating or transferring files among the computer systems 102 and 122. Therefore, this path 199 includes wireless connections, wired connections, and hybrid wireless/wired connections. The communication path 199 also includes couplings or connections to networks including local area networks (LANs), metropolitan area networks (MANs), wide area networks (WANs), proprietary networks, interoffice or backend networks, and the Internet. Furthermore, the communication path 199 includes removable fixed mediums like floppy disks, hard disk drives, and CD-ROM disks, as well as flash RAM, Universal Serial Bus (USB) connections, RS-232 connections, telephone lines, buses, and electronic mail messages.

The first 102 and second 122 computer systems each include an original version 110 of an electronic file, referred to herein as the original file 110. The first computer system 102 stores the original file 110 in a database 106 or other memory area or combination of memory areas or devices, but is not so limited. The second computer system 122 stores the original file 110 in device memory for use in operation.

At such time as a software provider upgrades the original file 110, for example to provide additional functionality or to fix a software bug, a new version 112 of the electronic file is generated. The new version 112 of the electronic file is referred to herein as the new file 112. The new file 112 is generally an updated or revised version of the original file 110, but is not so limited. The software provider transfers the new file 112 to the first computer system 102.

The electronic files 110 and 112 include software files including dynamic link library files, shared object files, embedded software components (EBSCs), firmware files, executable files, data files including hex data files, system configuration files, and files including personal use data, but are not so limited. Since any type of file can be regarded as a byte stream, hereafter a file can be described as a byte stream.

Components of the first computer system 102 including at least one processor 104 receive and process the new file 112 in order to generate upgrade information for use in upgrading the hosted original files 110 of the second computer system 122. In an embodiment, the processor 104 generates an upgrade file 118 for use in transferring information of the upgrades to the second computer systems 122. The upgrade file 118 can include a difference file that codes differences between the new file 112 and the original file 110 or, alternatively, can include any number and/or combination of components or modules of the new file 112. The first computer system 102 provides the upgrade information to the second computer systems 122 via transfer of the upgrade file 118 over the communication path 199.

In embodiments where the upgrade file 118 includes a difference file, components of the first computer system 102 including the processor 104 and the file differencing algorithm 114 process a comparison between the new file 112 and the corresponding original file 110, thereby calculating the differences between the new file 112 and the original file 110. The file differencing algorithm 114 generates the difference file during the comparison and writes the difference file to the upgrade file 118.

The upgrade file 118 is transferred or transmitted to the second computer system 122 via the communication path 199. Prior to transfer, the upgrade file 118 may be compressed using any of a number of compression techniques known in the art, but is not so limited.

Components of the second computer system 122 including the processor 124 and the upgrade client 126 receive the upgrade file 118 and control the upgrade of the original file using the upgrade file 118. In an embodiment, the upgrade client 126, including the file updating algorithm 128, processes information of the upgrade file 118 along with the hosted original file 110 to generate a copy of the new file 152. This copy of the new file 152 is subsequently used by the upgrade client 126 to upgrade 154 the targeted original file 110 hosted on the client device 122. The upgrade client 126 of an embodiment uses numerous methods to update EBSCs depending on the file type to be updated and the resources allocated by the client device manufacturer to support these updates, as described in the Related Applications. Upon completion of this update process, the original file 110 now stored on the second computer system 122 is the same as the new file 112 received in the first computer system 102.

Figure 2:
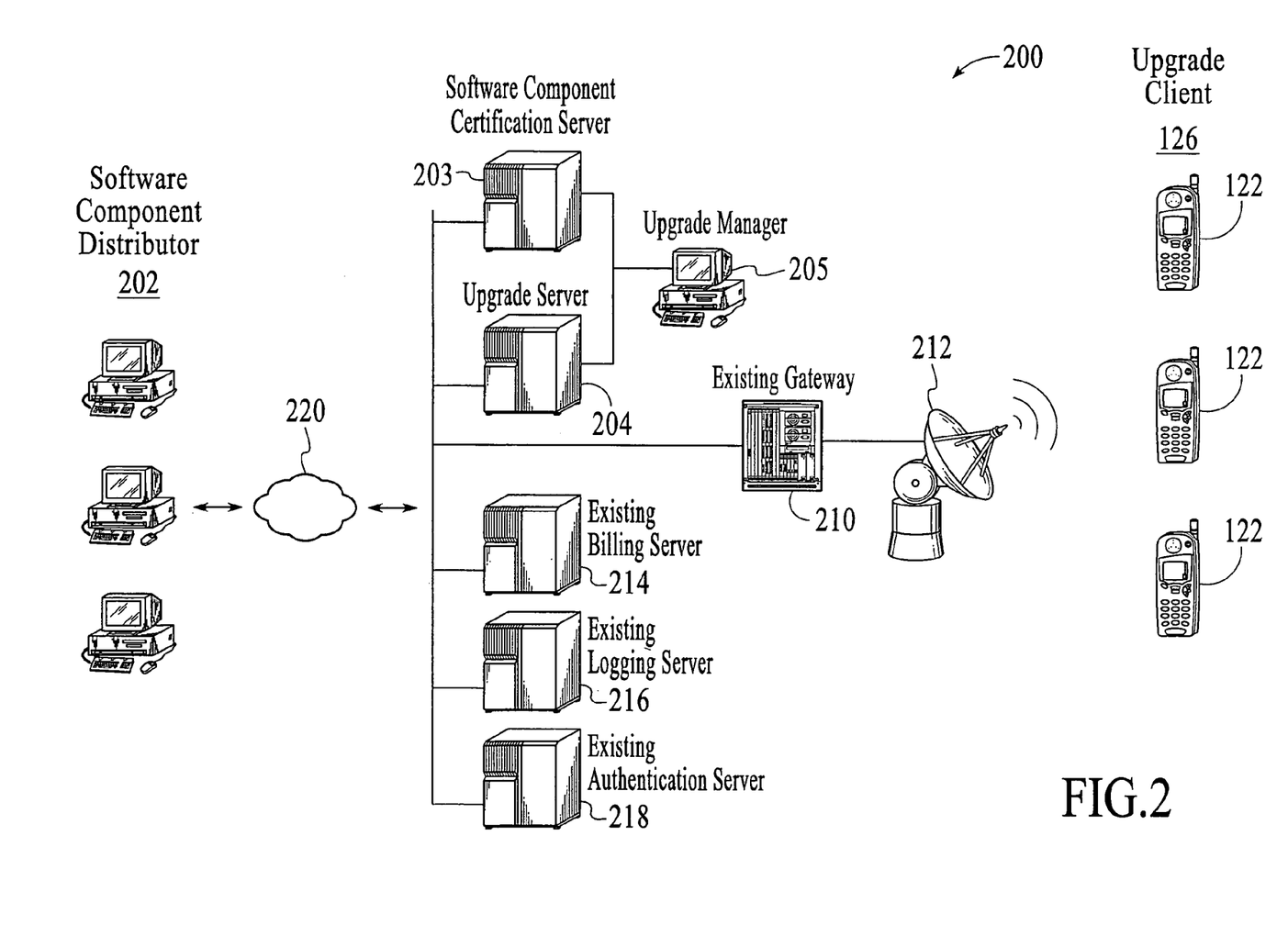
FIG. 2 is a block diagram of an example service provider infrastructure including components of the file upgrade system of an embodiment.

FIG. 2 is a block diagram of an example service provider infrastructure 200 including components of the file upgrade system 100 of an embodiment. In this embodiment the service provider infrastructure is described in the context of a cellular telephone network or infrastructure, but alternative embodiments are not so limited. The service provider infrastructure 200 includes, but is not limited to, a Software Component Distributor (SCD) 202, service provider upgrade components 203-205, and an upgrade client 126 hosted on the client devices 122. The service provider upgrade components 203-205 include an upgrade server 204 coupled among a software component certification server 203 and an upgrade manager 205.

With further reference to FIG. 1, the SCD 202 of an embodiment of the service provider infrastructure 200 includes components or functions of the first computer system 102. In alternative embodiments, the service provider upgrade components 203-205 host components or functions of the first computer system 102. In other alternative embodiments the components or functions of the first computer system 102 are distributed among components of the SCD 202 and the service provider upgrade components 203-205.

The service provider infrastructure 200 of an embodiment supports numerous types of software file or component upgrades on client devices 122 including mobile electronic devices, mobile communication devices, cellular telephones, personal digital assistants, computers, and other processor-based devices via the upgrade system components and various mechanisms of the service provider's wireless infrastructure. These systems function by receiving new and revised software from a software distributor, generating an upgrade file from the new software, and transferring the upgrade file to the client device 122 via the service provider infrastructure. The upgrade client 126 of the receiving or client device 122 uses the upgrade file to update the targeted software hosted on the client device 122.

The SCD 202 of an embodiment provides a user interface by which software providers package and release new embedded device software components. Functions of the SCD 202 include registering device information and submitting device information to the software component certification server. Also, the SCD 202 receives new and original EBSCs, calculates or generates file differences using the new and original EBSCs, registers and packages embedded software, and submits embedded software packages to the software component certification server 203. The new or revised software, following release, is provided to the service provider upgrade components 203-205 via a wired, wireless, or hybrid wired/wireless network coupling or connection 220, but is not so limited.

The SCD 202 of an embodiment is hosted on processing systems of the client device manufacturers. In an alternative embodiment, the SCD 202 is hosted on processing systems of an application or system software provider. In another alternative embodiment, the SCD 202 is hosted on processing systems of the service carrier or provider, for example hosted on or distributed among the upgrade components 203-205.

The service provider upgrade components 203-205 are coupled among the software component distributor 202, the client devices 122, and the existing components of the service provider's infrastructure 210-218, including the existing gateway 210 and communication infrastructure 212, billing server 214, logging server 216, and authentication server 218.

The software component certification server 203 provides an interface to the manufacturers of client devices and, thus, receives new device information on embedded software packages from device manufacturers. The software component certification server 203 also repackages and distributes approved software packages to upgrade servers.

The upgrade manager 205, while functioning as an interface among the software component certification server 203 and the upgrade server 204, configures software and data packaging for optimal device management, schedules remote change notifications, and controls the update policy monitor system. Moreover, the upgrade manager 205 provides integration with the systems of the existing infrastructure.

The upgrade server 204 provides capabilities including authenticating, connecting, and communicating with mobile client devices 122 to perform embedded software component upgrades. Communication with client devices 122 can occur via couplings 212 with the client devices 122 that include wireless couplings, wired couplings, hybrid wired/wireless couplings, and other network coupling types, as appropriate to the corresponding service provider. In addition, the upgrade server 204 supports existing billing, data collection, and logging services of the service provider.

As an example of communications among the upgrade server 204 and client devices 122, when an upgrade file is available for transfer to a client device 122 from the upgrade server 204, the server 204 sends a user notification to notify the client device user that there are software components available for updating. The user notification can take the form of a text message via a Short Message Service (SMS) push protocol, Hypertext Transfer Protocol (HTTP), or Wireless Application Protocol (WAP), but is not so limited. Upon receiving confirmation from the handset users, the upgrade server 204 uses the original handset data communication protocol to send the upgrade file to the requesting handset.

In response to receipt of the confirmation from the handset, the upgrade server 204 authenticates and authorizes the user and/or requesting device, and verifies prerequisite capabilities and limitations of the requesting device. Following authentication the upgrade server 204, as the manager of client device configuration data, identifies the current versions of embedded software components of the requesting device 122, identifies and transfers appropriate upgrade files to the requesting device 122, logs the status of the upgrade transaction, and reports the results to the upgrade manager 205.

The service providers of an embodiment, in providing software updates to client devices, use control policies to effectively manage the network capacity and control issues associated with the distribution of upgrade files to large numbers of users. These update control policies control the launch and execution of associated file upgrades, and are determined and assigned by the service provider. While many update control policies and combinations of policies are possible, two particular policies include an automatic update control policy and a user-selected update control policy. The automatic update supports the automatic updating of files on the client device without any action from the device user, while the user-selected update launches an update in response to some action by the device user. While the automatic and user-selected policies are described herein as examples, any number/combination of these or other update control policies may be used as recognized by one skilled in the art.

As with the numbers of update control policies available, many options are available as to the assignment of the update control policies to particular software file modules. Under one option, service providers associate different update control policies with different software modules. As an example, an automatic update control policy is assigned to a new file that eliminates a bug in the corresponding original file, while a user-selected update control policy is assigned to a new file that adds additional functionality to a game provided by a corresponding original file.

Under another option, service providers can associate different update control policies with the same software module. For example, a user-selected update control policy is assigned to a new file that adds additional functionality to a game provided by a corresponding original file, while an automatic update control policy is assigned to a subsequent update of the new file when the update eliminates a bug in the file. While many options are available to a service provider for assignment of update control policies, the upgrade system of an embodiment provides for automatic and dynamic selection of update control policies using pre-defined criteria.

Figure 3:
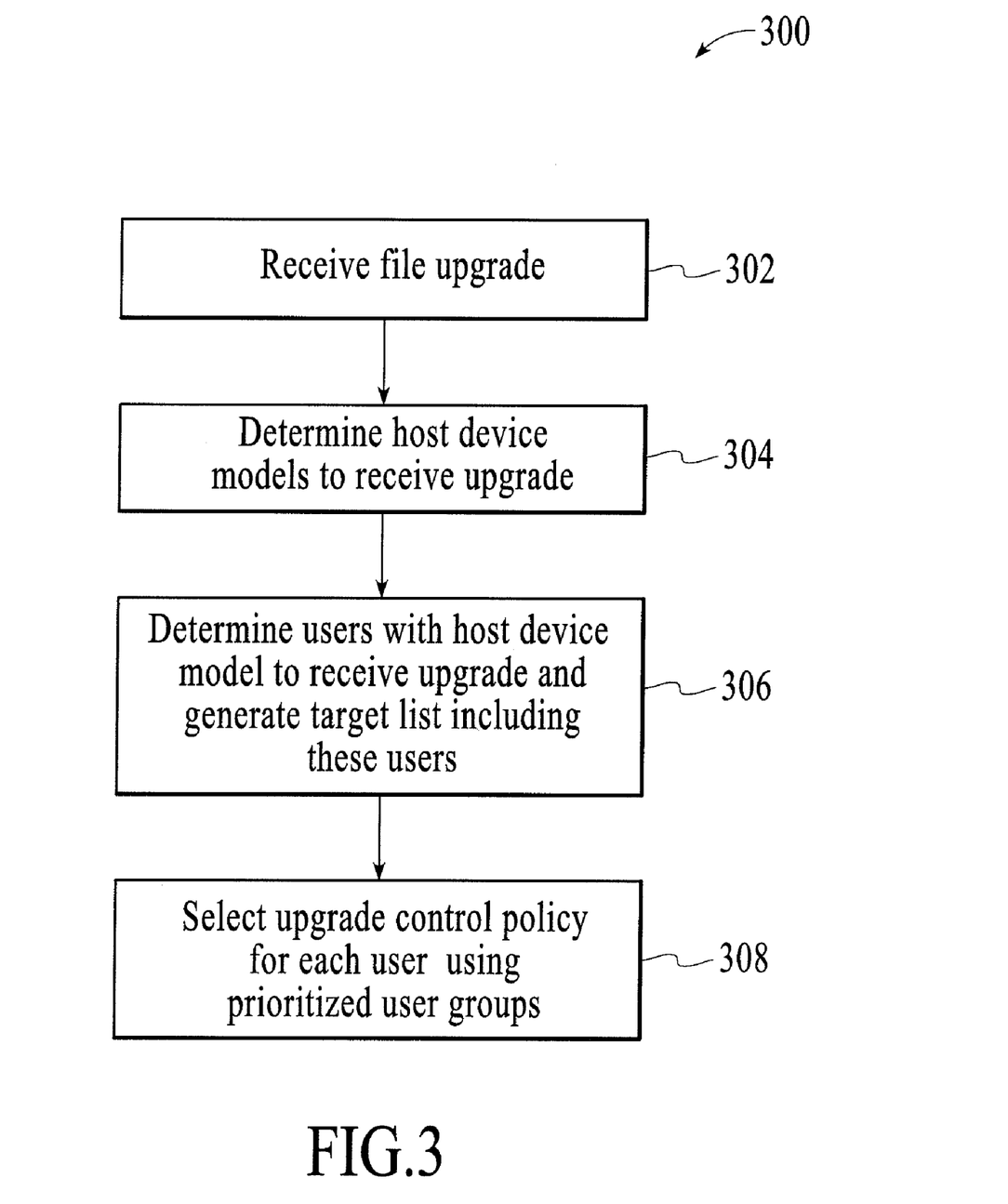
FIG. 3 is a flow diagram for controlling file upgrades using upgrade control policies, under an embodiment.

FIG. 3 is a flow diagram 300 for controlling file upgrades using upgrade control policies, under an embodiment. The upgrade system of an embodiment receives a new file or an upgrade file, as described above, at block 302. Components of the upgrade system identify models of the host device that use the original file with which the new file corresponds, at block 304. Using the identified host device models that include the original file, the upgrade system identifies users of these host device models, at block 306, and generates a target list including these users. The upgrade system processes the target list, using information of pre-defined user groups, to generate subgroups of the target list. The pre-defined user groups include one or more groupings of users according to a variety of pre-specified criteria, as described below. The upgrade system selects an upgrade control policy for each user according to the target list subgroup of which the user is a member, at block 308. The upgrade control policies include an automatic upgrade control policy and a user-selected upgrade control policy; however, alternative embodiments can include any number of upgrade policies selected from among additional and/or substitute upgrade policies.

Figure 4:
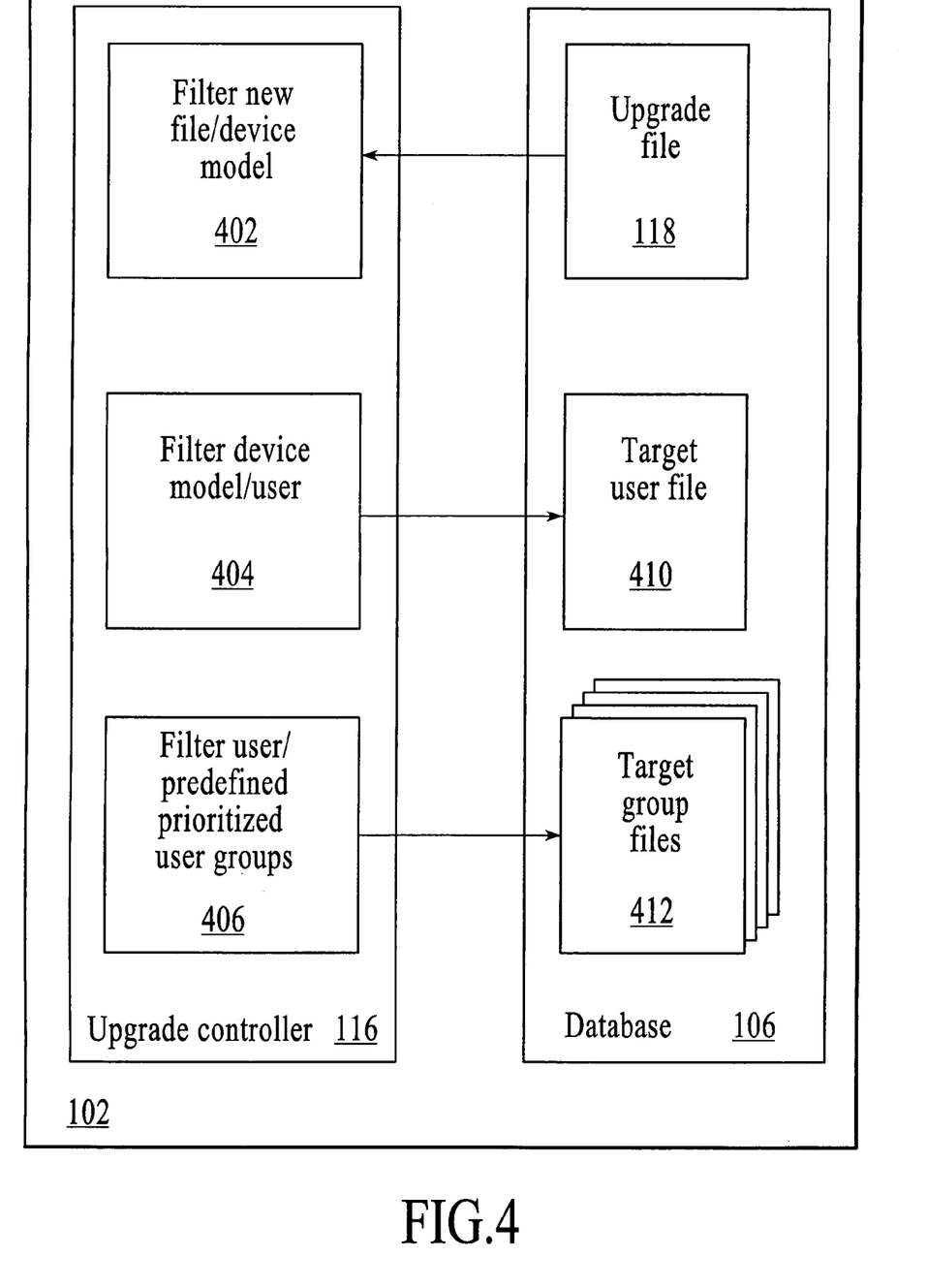
FIG. 4 is a block diagram of an upgrade controller and database for use in providing update control, under the upgrade system embodiment of FIG. 1.

FIG. 4 is a block diagram of an upgrade controller 116 and database 106 for use in providing update control, under the upgrade system embodiment of FIG. 1. Components of the upgrade controller 116 include a first filter means 402 for filtering based on a new file/client device model relationship, a second filter means 404 for filtering based on a client device model/user relationship, and a third filter means 406 for filtering based on a user/predefined user group relationship. In an embodiment, the first 402, second 404, and third 406 filter means are provided by one or more software algorithms, but the embodiment is not so limited. Alternative embodiments can use any number/combination of filters or algorithms to provide the functions of the exemplary first, second, and third filter means.

In operation, the first filter means 402 receives information of the upgrade file 118 during the processing of a new file 112 by the first communication system 102, as described above, and with reference to FIG. 1. The information of the upgrade file 118 can be coupled to the first filter means 402 from the database 106 or from other components of the first computer system 102, for example the file differencing algorithm 114. The first filter means 402 functions to identify models of the client device that include and use the original file with which the new file corresponds, and provides a list of these models to the second filter means 404. Upon generation, the list of models including the original file can be stored in the database 106, for example, but the embodiment is not so limited. The first filter means 402 uses information provided by the service provider, the manufacturer of the client device, or the software provider to generate the new file/client device model correspondence.

Using the list of identified client device models that include the original file, the second filter means 404 functions to identify users of these client device models and generates a target user file 410 or target list that includes these users. The second filter means 404 uses information provided by the service provider to generate the client device model/user correspondence, but is not so limited.

In an alternative embodiment, the second filter means 404 uses information dynamically gathered by the first computer system 102 to generate the client device model/user correspondence. The first computer system 102 gathers information of the client device model/user relationship using dynamic queries to the client device. The dynamic queries can be automatically generated and transmitted by the first computer system 102 in response to pre-defined criteria, but other embodiments provide for manual initiation of the queries. Upon receipt, responses to the queries are stored in the database 106 for use by the second filter means 404.

The upgrade controller 116 of an embodiment provides the target user file 410 to the third filter means 406 and, additionally, stores the target user file 410 in the database 106. Alternative embodiments of the upgrade controller may provide the target user file to the third filter means from the database. Further alternative embodiments may not store the target user file in the database or may store the target user file in another location or memory device.

The third filter means 406 processes the target user file 410, using information of pre-defined user groups, to generate target group files 412. Each target group file 412 includes any users of the target user file 410 that meet the pre-defined criteria for the corresponding group. The pre-defined user groups include one or more groups according to a variety of pre-specified criteria, for example, groupings according to city, county, state, region, area code, corporate sponsor, service plan type, and device make and/or model. Alternative embodiments can use any number/combination of these criteria, additional criteria, and/or different criteria.

The components of the first computer system 102 of an embodiment dynamically generate the pre-defined user groups using user information read from a user database. Additionally, the first communication system 102 can dynamically generate the user groups for each new file 112 received, using information of the new file 112.

The service provider uses the target group files 412 to control the flow of file updates to the client devices. In so doing, the service provider of an embodiment assigns an upgrade control policy to each pre-defined user group of an embodiment. Accordingly, components of the first computer system 102 associate the pre-assigned upgrade control policies with the target group files 412, as appropriate.

The first computer system 102 of an alternative embodiment also uses pre-defined user groups to generate the target group files 412, as described above. In this alternative, however, the first computer system 102 dynamically assigns upgrade control policies to the target group files 412 instead of assigning the upgrade control policies to the pre-defined user groups. This provides additional flexibility in subsequently reallocating upgrade control policies among the target groups.

The upgrade control policies include an automatic upgrade control policy and a user-selected upgrade control policy, as described above; however, alternative embodiments can include any number of upgrade policies selected from among additional and/or different upgrade policies.

The automatic upgrade control policy controls the first computer system to automatically provide an available upgrade to the second computer system via the upgrade file. The user-selected upgrade control policy controls the first computer system to provide a message to a user that a particular upgrade is available and inquiring as to whether the user wants to receive the upgrade. The first computer system provides the upgrade to the second computer system when the user elects to receive the upgrade via a return message.

The process of placing users in the pre-defined user groups may result in some users being excluded from all groups while other users are placed in more than one group. A user excluded from all groups would not receive an upgrade/upgrade notification, while a user in more than one group would receive more than one upgrade/upgrade notification. Therefore, the upgrade controller 116 uses both a default group and assigned group priorities to ensure that every user associated with the service provider receives one and only one upgrade/upgrade notification.

In addition to the groups described above corresponding to the pre-defined criteria, the upgrade controller 116 uses a default group to ensure that every user is in at least one group. As such, any user in the target user file not meeting the criteria for placement in at least one pre-defined group is placed in the default group. The default group is associated with an upgrade control policy, as described above, so that users in the default group receive upgrades/upgrade notifications in accordance with the default group upgrade control policy.

With regard to group priorities, the service provider assigns a priority to each of the pre-defined user groups. The upgrade controller 116, in preparing to send upgrades/upgrade notifications to the users, reads the target group files and identifies users that are in more than one group. For each user in more than one group, the upgrade controller 116 selects an upgrade control policy for the user in accordance with the priorities of the groups of which the user is a member. For example, the upgrade controller 116 selects the upgrade control policy associated with the highest priority group of which the user is a member. Alternatively, the upgrade controller 116 selects the upgrade control policy associated with the lowest priority group of which the user is a member.

In an alternative embodiment, components of the first computer system 102 dynamically determine the priorities based on criteria or rules provided by the service provider. In another alternative embodiment, components of the first computer system 102 dynamically determine the priorities based on information included in the new file. In yet another alternative embodiment, components of the first computer system 102 dynamically determine the priorities for each file upgrade. The upgrade controller 116 of each of these alternative embodiments uses the priority as described above.

Aspects of the invention may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other processing systems and communication systems, not only for the file updating described above.

The elements and acts of the various embodiments described above can be combined to provide further embodiments. These and other changes can be made to the invention in light of the above detailed description.

All of the above references and United States patents and patent applications are incorporated herein by reference. Aspects of the invention can be modified, if necessary, to employ the systems, functions and concepts of the various patents and applications described above to provide yet further embodiments of the invention.

In general, in the following claims, the terms used should not be construed to limit the invention to the specific embodiments disclosed in the specification and the claims, but should be construed to include all processing systems that operate under the claims to provide a method for file differencing and updating. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What I claim is:

1. A system for upgrading electronic files, comprising:
    a first device comprising a server, the first device including at least one processor configured to,
        receive a new electronic file that is an updated version of an original electronic file;
        identify models of a plurality of second devices that each host the original electronic file, wherein the plurality comprises wireless communication devices;

generate a target list that identifies users of the identified models;
generate subsets of the target list using data of pre-defined user groups, wherein each user is a member of at least one user group; and
select an upgrade control policy for each user according to the subset of the target list of which the user is a member;
assign a priority to each pre-defined user group, wherein selecting an upgrade control policy further comprises selecting an upgrade control policy for each user according to the assigned priority of the pre-defined user group of which the user is a member; and
the plurality of second devices, wherein the plurality of second devices are each configured to receive an electronic message corresponding to the selected upgrade control policy from the first device via at least one coupling, the plurality of second devices controlling upgrading of the original electronic file hosted on each of the plurality of second devices in response to the received electronic message according to the upgrade control policy and a subset of the target list, such that the original electronic file is upgraded on a subset of the plurality of second devices corresponding to the subset of the target list.

2. The system of claim 1, wherein the first device is accessible by at least a provider of software running on the at least one second device.

3. The system of claim 1, wherein the upgrade control policy is at least one of an automatic upgrade control policy and a user-selected upgrade control policy.

4. The system of claim 3, wherein the first device automatically provides the new electronic file to the at least one second device under the automatic upgrade control policy.

5. The system of claim 3, wherein the first device provides a notification message to the at least one second device as to the availability of the new electronic file under the user-selected upgrade control policy, wherein the first device provides the new electronic file to the at least one second device upon receiving a selection response to the notification message from a user via the at least one second device.

6. The system of claim 1, wherein the first device further dynamically generates the pre-defined user groups using information of a user database.

7. The system of claim 1, wherein the at least one second device is at least one processor-based device selected from among personal computers, portable computing devices, cellular telephones, portable communication devices, and personal digital assistants.

8. The system of claim 1, wherein the at least one coupling is selected from among wireless couplings, wired couplings, hybrid wireless/wired couplings, and couplings to networks including local area networks (LANs), metropolitan area networks (MANs), wide area networks (WANs), proprietary networks, backend networks, the Internet, and removable fixed mediums including floppy disks, hard disk drives, and CD-ROM disks, as well as telephone lines, buses, and electronic mail messages.

9. The system of claim 1, wherein the original and new electronic files comprise software files including dynamic link library files, shared object files, embedded software components (EBSCs), firmware files, executable files, data files including hex data files, system configuration files, and files including personal use data.

10. The system of claim 1, wherein the new electronic file is at least one of a new version of the original electronic file and a difference file, wherein the difference file includes coded differences between the new electronic file and the original electronic file.

11. A method for controlling electronic file upgrades of a host device, comprising:
receiving in the host device a new electronic file that is an updated version of an original electronic file, wherein the host device comprises a wireless communication device;
identifying models of the host device that include the original electronic file;
generating a target list that includes users of the identified models;
generating subsets of the target list using data of pre-defined user groups, wherein each user is a member of at least one user group;
selecting an upgrade control policy for each user according to the subset of the target list of which the user is a member, wherein an upgrade control policy controls device update parameters comprising, update type, which device files are available for updating, and update timing information;
assigning a priority to each pre-defined user group;
selecting an upgrade control policy for each user according to a highest assigned priority of the pre-defined user group of which the user is a member when the user is a member of more than one pre-defined user group; and
controlling an electronic file upgrade using one or more upgrade control policies, wherein after the electronic file upgrade, upgraded identified models comprise a subset of the identified models, wherein the electronic file upgrade affects the behavior of the host device.

12. The method of claim 11, wherein the upgrade control policy is at least one of an automatic upgrade control policy and a user-selected upgrade control policy.

13. The method of claim 11, further comprising dynamically generating the pre-defined user groups using information of a user database.

14. The method of claim 11, further comprising dynamically generating the pre-defined user groups for each new electronic file received using information of the new electronic file.

15. The method of claim 11, wherein the pre-defined user groups include at least one group selected from among a city group, a state group, an area code group, a corporate group, and a service plan group.

16. The method of claim 11, wherein generating the target list further comprises comparing the identified models with information of a user database.

17. The method of claim 11, wherein generating the target list further comprises:
transmitting electronic queries to host devices;
generating information of user/host device model relationships using information of received responses to the queries; and
comparing the identified models with the user/host device model relationship information.

18. The method of claim 11, further comprising assigning an upgrade control policy to each pre-defined user group.

19. The method of claim 18, wherein the priority corresponds to the new electronic file.

20. The method of claim 18, wherein selecting an upgrade control policy further comprises selecting an upgrade control policy for each user according to the assigned priority of the pre-defined user group of which the user is a member.

21. The method of claim 11, further comprising transmitting an electronic message corresponding to the selected upgrade control policy to each host device.

22. The method of claim 11, wherein the new electronic file is at least one of a new version of the original electronic file and a difference file, wherein the difference file includes coded differences between the new electronic file and the original electronic file.

23. An apparatus that controls electronic file upgrades of a portable host device, wherein the electronic file upgrade affect behavior of the host device, the apparatus comprising:
    means for receiving a new electronic file that is an updated version of an original electronic file;
    means for identifying models of the host device that include the original electronic file;
    means for generating a target list that includes users of the identified models;
    means for generating a plurality of subsets of the target list using data of pre-defined user groups, wherein each user is a member of at least one user group;
    means for selecting one of a plurality of upgrade control policies for each user according to a subset of the target list of which the user is a member;
    means for assigning a priority to each pre-defined user group, wherein selecting an upgrade control policy further comprises selecting an upgrade control policy for each user according to the assigned priority of the pre-defined user group of which the user is a member; and
    means for transmitting an electronic message corresponding to the selected upgrade control policy to each host device, wherein in response to the electronic message a subset of the identified models participate in an upgrade process that results in the original electronic file being replaced by the new electronic file, wherein the subset of the identified models is determined by at least one of, the subsets of the target list, and the upgrade control policies.

24. The apparatus of claim 23, further comprising means for assigning a priority to each pre-defined user group.

25. The apparatus of claim 23, wherein the upgrade control policy is at least one of an automatic upgrade control policy and a user-selected upgrade control policy.

26. A computer-readable storage medium including executable instructions which, when executed in a processing system, control electronic file upgrades of a host device, wherein the electronic file updates affect behavior of the host device, wherein the executed instructions control electronic file upgrades by:
    receiving a new electronic file that is an updated version of an original electronic file;
    identifying models of the host device that include the original electronic file;
    generating a target list that includes users of the identified models;
    generating a plurality of subsets of the target list using data of pre-defined user groups, wherein each user is a member of at least one user group; and
    selecting one of a plurality of upgrade control policies for each user according to a subset of the target list of which the user is a member;
    assigning a priority to each pre-defined user group, wherein selecting an upgrade control policy further comprises selecting an upgrade control policy for each user according to the assigned priority of the pre-defined user group of which the user is a member; and
    transmitting an electronic message corresponding to the selected upgrade control policy to each host device, wherein in response to the electronic message a subset of the identified models participate in an upgrade process that results in the original electronic file being replaced by the new electronic file, wherein the subset of the identified models is determined by at least one of, the subsets of the target list, and the upgrade control policies.

* * * * *